United States Patent [19]

Frantl et al.

[11] 4,067,437
[45] Jan. 10, 1978

[54] CHAIN CONVEYOR

[76] Inventors: Erich Frantl, Gablenzgasse 24, 1160 Vienna; Peter Hofstatter, Taubergasse 5-7, 1170 Vienna, both of Austria

[21] Appl. No.: 611,604

[22] Filed: Sept. 9, 1975

[30] Foreign Application Priority Data

Sept. 9, 1974 Austria ................................ 7223/74
Oct. 17, 1974 Austria ................................ 8337/74

[51] Int. Cl.² ........................................... B65G 17/18
[52] U.S. Cl. .................................. 198/800; 198/799; 214/16.1 B
[58] Field of Search ............... 198/793, 796, 797, 799, 198/800; 214/16.1 CD, 16.1 B, 16.1 BA, 16.1 BB; 187/16

[56] References Cited

U.S. PATENT DOCUMENTS

| 2,242,813 | 5/1941 | Cook | 198/800 |
|---|---|---|---|
| 3,405,795 | 10/1968 | Mascherpa | 198/796 X |
| 3,447,666 | 6/1969 | Nevo-Hacohen | 198/800 |

FOREIGN PATENT DOCUMENTS 481,595 6/1953 Italy ................................ 198/799

Primary Examiner—Evon C. Blunk
Assistant Examiner—James L. Rowland
Attorney, Agent, or Firm—Wenderoth, Lind & Ponack

[57] ABSTRACT

An endless conveyor includes plural load bearing plates mounted for continual horizontal movement by two endless chains which run in spaced and parallel vertical planes. Each plate has at diagonally opposite corners thereof a pivotally connected main support which is driven by one of the chains. Each plate also has pivotally connected thereto, at only one of the other corners thereof, an auxiliary support which is not driven by a chain but which is laterally aligned with and rotationally connected with a laterally opposite main support. The remaining corner of each plate is unsupported. All of the three supports have rollers which are guided in endless guide rails, such that the plates maintain a constant horizontal alignment.

4 Claims, 6 Drawing Figures

CHAIN CONVEYOR

BACKGROUND OF THE INVENTION

The present invention relates to an endless chain conveyor, especially of the type for motor cars, and including two parallel chains which run in parallel vertical planes, the chains being connected with a number of rectangular plates which are each mounted close to the end of an adjacent plate and which are guided by means of rollers in guide rails that are arcuately bent in areas of deflection between upper and lower runs of the chains to provide endless paths, the plates always remaining in a horizontal position around the endless paths.

Previously, chain conveyors of such type have deflection mechanisms which have respective points of attack at all four corners of the plates. Such arrangement, however, entails certain disadvantages.

Basically the conveying assemblies may be either "longitudinal conveyors", i.e. conveyors on the plates of which the cars extend in the direction of the movement of the conveyor, or they may be "transverse conveyors," i.e. conveyors on which the cars extend perpendicular to the direction of conveyor movement. In the conventional transverse conveyors, access to the cars has to be arranged in the upper conveyor run, and this necessitates either a correspondingly large ramp, or the entire conveyor assembly must be lowered such that the upper surface of the plates is substantially aligned with the surface of the surrounding ground, which solution, however, requires considerable earth works.

With longitudinal conveyors it is possible to have access in the lower conveyor run, and this provides the advantages that less space is necessary for ramps and that no extensive earth works are necessary. However, it is still necessary that the plates be broad enough to permit the door of the car to be opened and the driver to get out. This again results in a larger structure which demands more room.

SUMMARY OF THE INVENTION

Therefore, the object of the present invention is to provide a chain conveyor which avoids the disadvantages of the conventional conveyors.

According to the invention, this is achieved by the fact that stabilizing rollers, provided for guiding each plate in the area of the end thereof which is not connected with a chain, are provided on only one of the plate sides parallel to the conveying direction.

The chain conveyor according to the invention enables one deflection mechanism or arcuate transition run to be left out, since the plates are held at only three points and the bearings of only these three points need be deflected. This results in lower costs of the total construction and requires less room. Further, for longitudinal conveyors, there is provided the special advantage that the room necessary to open the door of the car to get out is inherently provided, and thus broader plates are not necessary.

With transverse conveyors the elimination of one deflection device results in the advantage that the space necessary for access to the vehicles is inherently provided and that it is not necessary to have the access in the upper horizontal area of the path of the plates. Rather, it is possible to have the access in the area of deflection of the plates, and even in the lower half thereof. Thus, it is necessary to provide only relatively small ramps, or it is sufficient to lower the whole construction by only a relatively small amount with respect to the surrounding surface, thereby reducing the necessary earth works to a minimum.

BRIEF DESCRIPTION OF THE DRAWINGS

The invention will be described in more detail below with reference to the attached drawings, wherein.

DETAILED DESCRIPTION OF THE INVENTION

Figure 5:
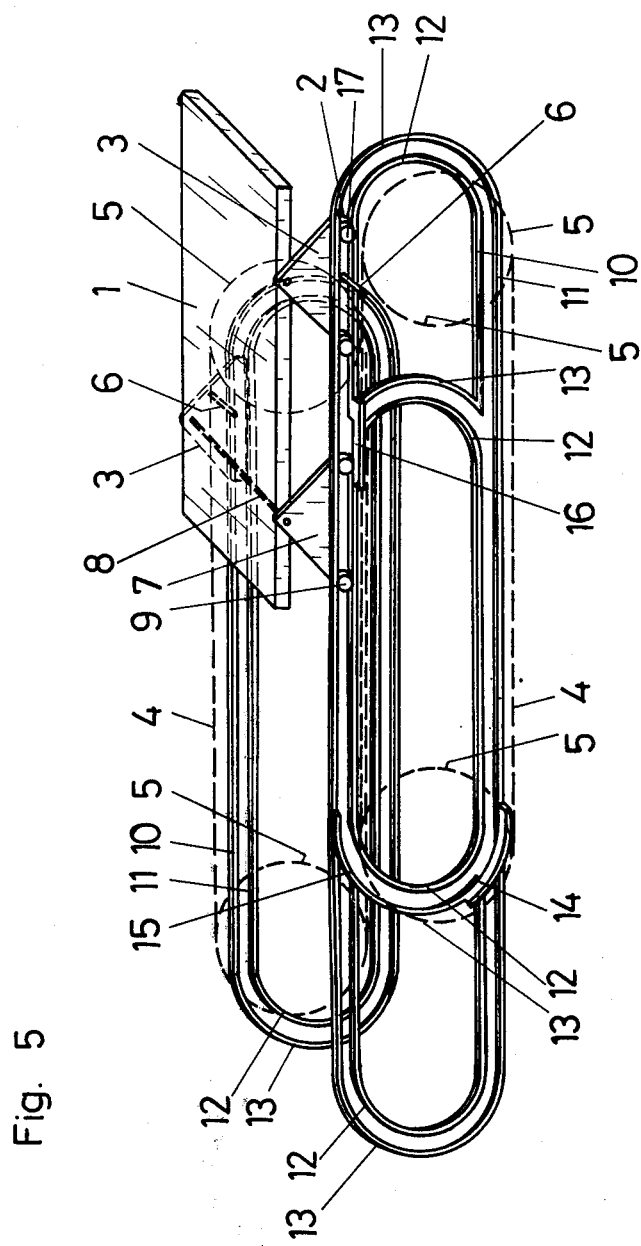
FIGS. 5 and 6 are, respectively, perspective and plan views of a particularly advantageous arrangement for bearing and guiding of the plates.
Figure 6:
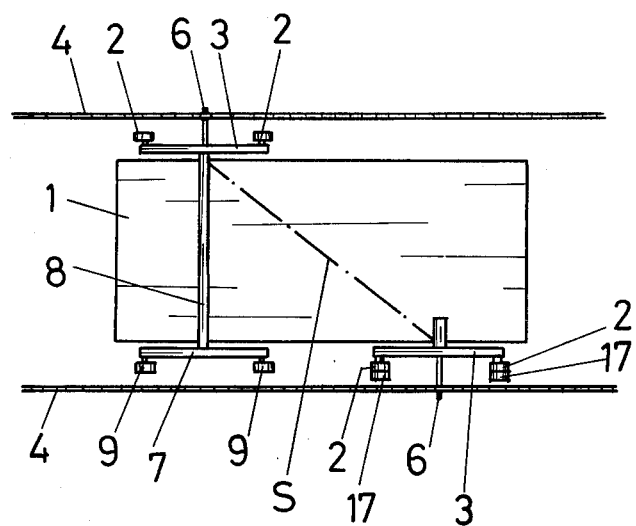

As can be seen particularly in FIGS. 5 and 6, each load bearing element, such as plate 1, rests on two supports that are arranged diagonally of the plate and that are each provided with two rollers, in such a way that these supports are tiltable with respect to their mountings on the plate. These supports, which will be referred to as main supports 3 in the following discussion, are connected with and driven by respective adjacent chains 4. The chains 4 are driven in synchronism with each other and guided over deflection wheels 5 between upper and lower runs. Transport or connection devices 6, connected to respective chains 4, are guided in longitudinal slots in the main supports 3 and operate to move the plates and lift and lower the plates in the areas of deflection or transition between the upper and lower runs. Basically, it would be possible for the chains 4 to gear or mesh directly with the pin bolt or axle of one of the rollers 2. Preferably the unloaded plate 1 is borne on the two main supports 3 in such a way that it is in an unstable equilibrium over the theoretical pivoting axis (S) which connects the two main supports 3.

In order to stabilize the plate 1 itself, as well as the loads resting thereon, a single additional stablizing support 7 is arranged coaxially with one of the main supports 3 on an opposite side of the plate 1 thereof.

The stabilizing support 7 is connected with a main support 3 on the opposite side of the plate 1 by means of a distortion-free or twist-free axle or rod 8 in such a way that the two thus connected supports can only turn together and only by the same amount around their bearings or mountings. This connection would also be effected in some other way, i.e. in such a way that the coaxial arrangement of the two supports 3 and 7 is not absolutely necessary. The rollers 2 of the two main supports 3 as well as the rollers 9 of the single stabilizing support 7 are provided with guide rails which are in the form of a pair of rails. Each pair of rails includes an upper rail 10 and a lower rail 11, each of which extends between the upper and lower transportion planes by means of inner 12 and outer 13 arcuate sections. The pair of rails is necessary because the pressures of the rollers 2 and 9 are directed in both directions, i.e. inwardly and outwardly.

Theoretically, the side of each plate which is supported by a main support 3 and a stabilizing support 7 should be provided with two adjacent continuous guide rails, each including a pair of rails 10 and 11, the two guide rails being longitudinally offset or staggered by the axial distance between the turning point of the main support 3 and that of the stabilizing support 7 on the same side of the plate. The guide rail of the stabilizing support, which lies closer to the plate, must however be interrupted in the points where it is crossed or intersected by the outer guide rail. In practical use the outer guide rail is usually left out for financial reasons and in order to save room, and the two guide rails are preferably arranged in a single vertical plane. At the positions where the inner guide rail interrupts or intersects the outer guide rail, a part of the outer guide rail must be maintained as bridge portions 14, 15 and 16, and that main supports having an adjacent stabilizing support has second, outer rollers which are coaxial with the inner rollers 2. These two additional rollers 17 are designed only for running over the bridges 14, 15 and 16.

While the paths of the main supports on the guide rails are always continuous on the side exposed to the pressure of the rollers, the path of the stabilizing support on the guide rail remains in its desired position even if only one of its rollers rests on the guide rail, while the other roller passes the gap in the guide rail.

Figure 1:
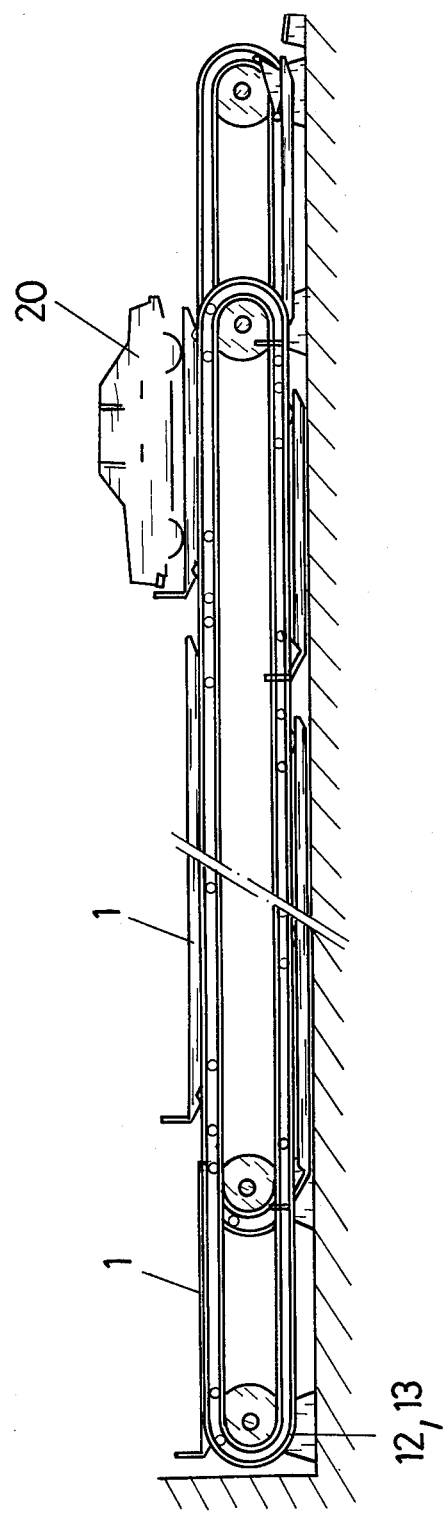
FIGS. 1 and 2 are, respectively, side and top elevation views of a longitudinal conveyor according to the invention.
Figure 2:
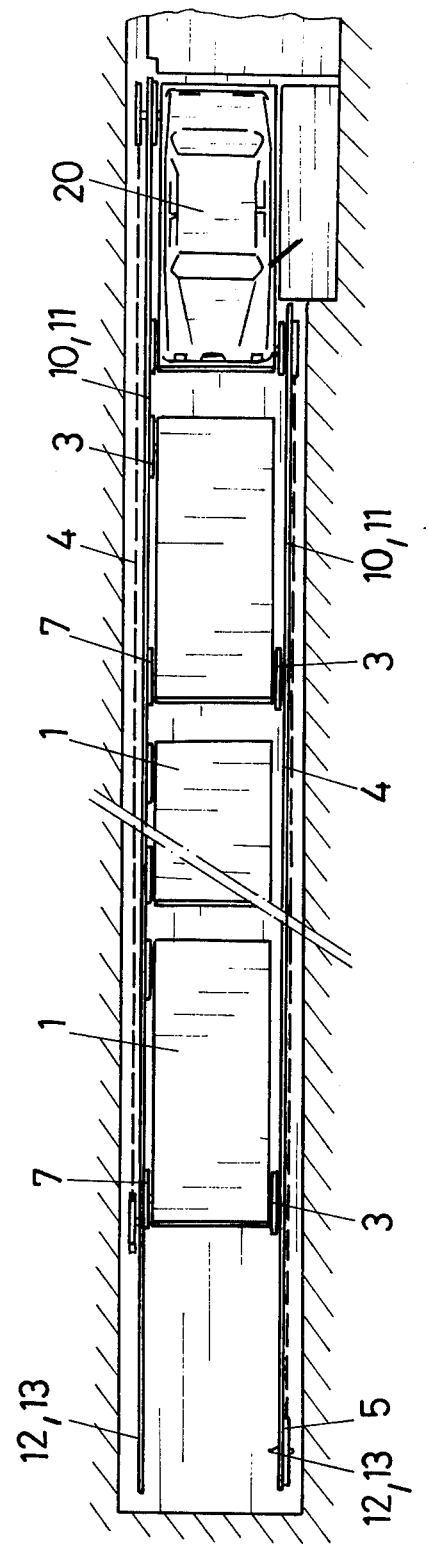

As can be seen from FIGS. 1 and 2, it is sufficient that the plates 1, when used as longitudinal conveyors, are about as broad as the cars 20, even if the access of the cars onto the plates 1 happens in the plane of the lower horizontal path of the plates 1. The room necessary for access to the car is thus available since the overall conveyor only needs three arcuate transition runs formed by rails 12 and 13, rather than four such arcuate transition runs.

Figure 3:
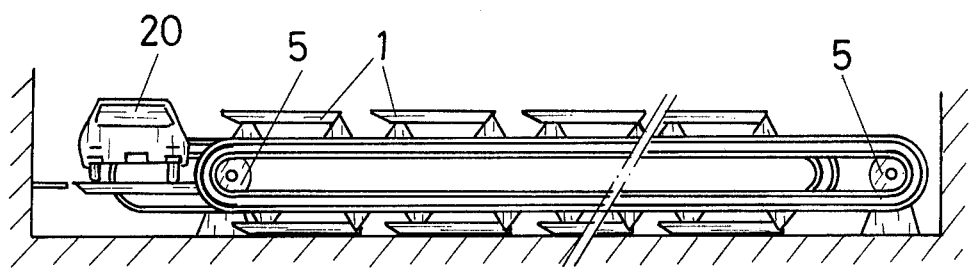
FIGS. 3 and 4 are, respectively, side and top elevation views of a transverse conveyor according to the invention.
Figure 4:
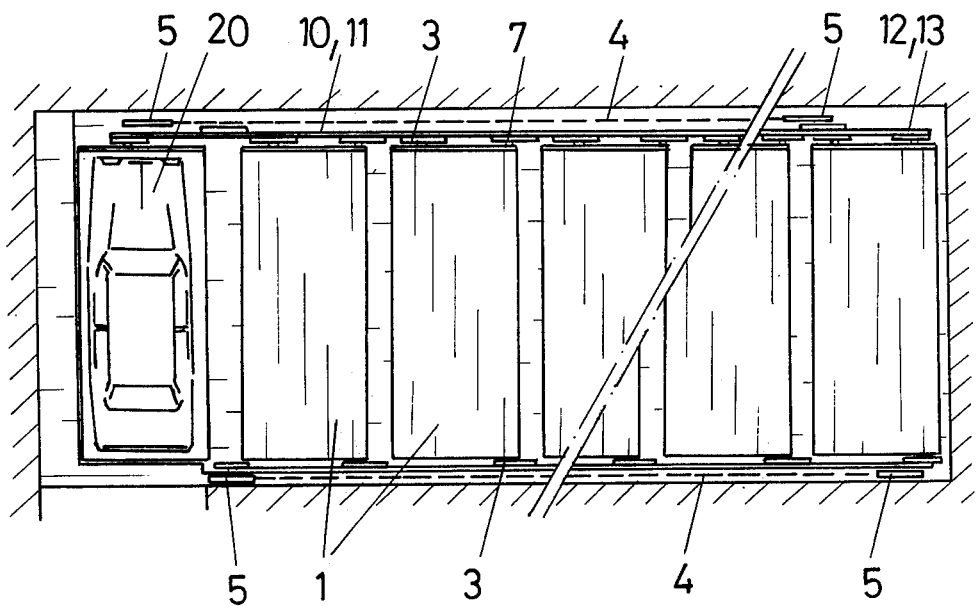

The advantage of the three point support for the plate when employed in transverse conveying assemblies will be apparent from FIGS. 3 and 4 and is even more remarkable. The transition run formed by rails 12 and 13 permits an access to the cars to be located only slightly above the level of the lower chain run.

The support arrangement for each plate 1 as shown in the drawings, particularly in FIGS. 5 and 6, achieves many advantages, but is, however, not absolutely necessary. Thus, it is, e.g., also possible to support the plate simply by three rollers. In this case it would, however, be necessary to provide appropriate deflection devices, e.g. gear wheels or reversing arms in combination with guide rails, as are used for conventional four point supporting of the plates.

What we claim is:

1. An endless conveyor, particularly for transporting motor vehicles, said conveyor comprising:
    two endless chains movably mounted to run in parallel and spaced vertical planes;
    a plurality of plates mounted for horizontal movement with said chains;
    each said plate having directly pivotally connected thereto a pair of main supports, said main supports being directly connected adjacent diagonally opposite corners of the respective said plate;
    means drivingly connecting said chains with the adjacent said main supports;
    each said plate having directly pivotally connected thereto a single auxiliary stabilizing support at a position laterally opposite one only of said main supports, the corner of said plate laterally opposite the other of said main supports being free of support;
    each of said main supports and said single auxiliary support having thereon spaced rollers;
    a pair of endless guide rails, one each positioned in a plane parallel with and adjacent to one of said chains, each of said guide rails having an upper run and a lower run joined by arcuate end transition runs, each said guide rail comprising a pair of rails spaced by a distance substantially equal to the diameter of said rollers, said rollers of said main supports and said single auxiliary support being guided between the pair of rails of the respective of said guide rails;
    the one said guide rail positioned adjacent the side of said plates having said auxiliary support having additional arcuate transition runs;
    the longitudinal distance between said auxiliary support and said main support on the same lateral side of each of said plates being equal to the spacing between respective of said arcuate end transition runs and said additional arcuate transition runs of said one guide rail; and
    connection means, joining said auxiliary support with the laterally opposite said main support, for causing turning of said auxiliary support around one of said arcuate transition runs to be contrained to and correspond with turning of said laterally opposite main support.

2. A conveyor as claimed in claim 1, wherein each of said supports has thereon two longitudinally spaced rollers supported in the respective said guide rails.

3. A conveyor as claimed in claim 1, wherein said connection means comprises a twist-free axle joining said auxiliary support with said laterally opposite main support.

4. A conveyor as claimed in claim 1, wherein said arcuate transition runs contacted by said main supports have outwardly extending bridge portions and said rollers of said main supports on the lateral side of said plates having said auxiliary support extend laterally outwardly by a distance to contact said bridge portions.

* * * * *